US012700423B1

(12) United States Patent
Yavuz

(10) Patent No.: US 12,700,423 B1
(45) Date of Patent: Aug. 4, 2026

(54) DOUBLE-MASK NEAR-FIELD TRANSDUCER (NFT) AND METHOD THEREOF

(71) Applicant: Western Digital Technologies, Inc., San Jose, CA (US)

(72) Inventor: Serdar Yavuz, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/243,360

(22) Filed: Jun. 19, 2025

(51) Int. Cl.
*G11B 5/127* (2006.01)
*G11B 5/00* (2006.01)

(52) U.S. Cl.
CPC .... *G11B 5/1278* (2013.01); *G11B 2005/0021* (2013.01)

(58) Field of Classification Search
CPC ...................... G11B 5/1278; G11B 2005/0021
See application file for complete search history.

(56) References Cited

U.S. PATENT DOCUMENTS

| | | | |
|---|---|---|---|
| 8,107,326 B1 | 1/2012 | Hirano et al. | |
| 8,184,507 B1 | 5/2012 | Hirano et al. | |
| 8,343,364 B1 | 1/2013 | Gao et al. | |
| 8,804,468 B2 | 8/2014 | Zhao et al. | |
| 9,065,236 B2 | 6/2015 | Goulakov et al. | |
| 9,286,920 B1 | 3/2016 | Hu et al. | |
| 10,127,938 B2 | 11/2018 | Goggin et al. | |
| 10,229,704 B2 | 3/2019 | Blaber et al. | |
| 10,242,702 B1 | 3/2019 | Peng | |
| 10,916,263 B1 * | 2/2021 | Truong ................. | G11B 5/3146 |
| 11,574,647 B1 * | 2/2023 | Yu ......................... | G11B 5/6088 |
| 2005/0167830 A1 | 8/2005 | Chang et al. | |
| 2005/0183960 A1 | 8/2005 | Andideh et al. | |
| 2006/0220192 A1 | 10/2006 | Kurachi et al. | |
| 2006/0251137 A1 | 11/2006 | Sung et al. | |
| 2007/0201530 A1 | 8/2007 | Rhee et al. | |
| 2008/0054457 A1 | 3/2008 | Lin et al. | |
| 2009/0154514 A1 | 6/2009 | Oh et al. | |
| 2009/0225636 A1 | 9/2009 | Hirano et al. | |
| 2010/0085664 A1 | 4/2010 | Hirata et al. | |

(Continued)

OTHER PUBLICATIONS

International Search Report and Written Opinion for International Application No. PCT/US2022/016654 dated Jun. 27, 2022.

(Continued)

*Primary Examiner* — Andrew Sasinowski
(74) *Attorney, Agent, or Firm* — Patterson + Sheridan, LLP

(57) ABSTRACT

A double mask process may be used to define layers of a near field transducer (NFT) to enable independent control over each layer. Controlling critical features of the NFT, including the apex width, taper angles, and flare angles is important for achieving desired areal density capabilities (ADC) of heat-assisted magnetic recording (HAMR) devices. By using a first mask to define a first layer of the NFT then a second mask to define a second layer of the NFT, limitations of the single mask NFT definition process may be overcome. For example, the limitation of using the same flare shape for both the first and the second NFT layers. Further, since the apex width of the NFT is defined by a separate mask, further scaling down of the apex width may also be achieved in a double mask NFT definition process.

21 Claims, 15 Drawing Sheets

(56) References Cited

U.S. PATENT DOCUMENTS

| | | | |
|---|---|---|---|
| 2011/0216635 A1 | 9/2011 | Matsumoto | |
| 2012/0230361 A1 | 9/2012 | Adachi et al. | |
| 2016/0284370 A1 | 9/2016 | Takayama et al. | |
| 2016/0351209 A1* | 12/2016 | Chen ..................... | G11B 5/3116 |
| 2017/0256277 A1 | 9/2017 | Peng | |
| 2020/0091679 A1 | 3/2020 | Furuyama | |
| 2020/0144792 A1 | 5/2020 | Dummer | |
| 2021/0398556 A1* | 12/2021 | Stipe ..................... | G11B 5/314 |
| 2024/0296866 A1 | 9/2024 | Xu et al. | |

OTHER PUBLICATIONS

International Search Report and Written Opinion for International Application No. PCT/US2022/019987 dated Aug. 9, 2022.

Datta, Anurup et al., "Improved Near-Field Transducer Design for Heat-Assisted Magnetic Recording", IEEE Transactions on Magnetics, vol. 52, No. 12, Dec. 2016, pp. 1-6.

Zhou, Nan et al., "Plasmonic near-field transducer for heat-assisted magnetic recording", Science Wise Publishing & De Gruyter, 2014, pp. 141-155.

Challener, W. A. et al., "Heat-assisted magnetic recording by a near-field transducer with efficient optical energy transfer", Nature Photonics, Mar. 2009, pp. 220-224.

Kryder, Mark H. et al., "Heat Assisted Magnetic Recording", Proceedings of the IEEE, vol. 96, No. 11, Nov. 2008, pp. 1-27.

* cited by examiner

300

500

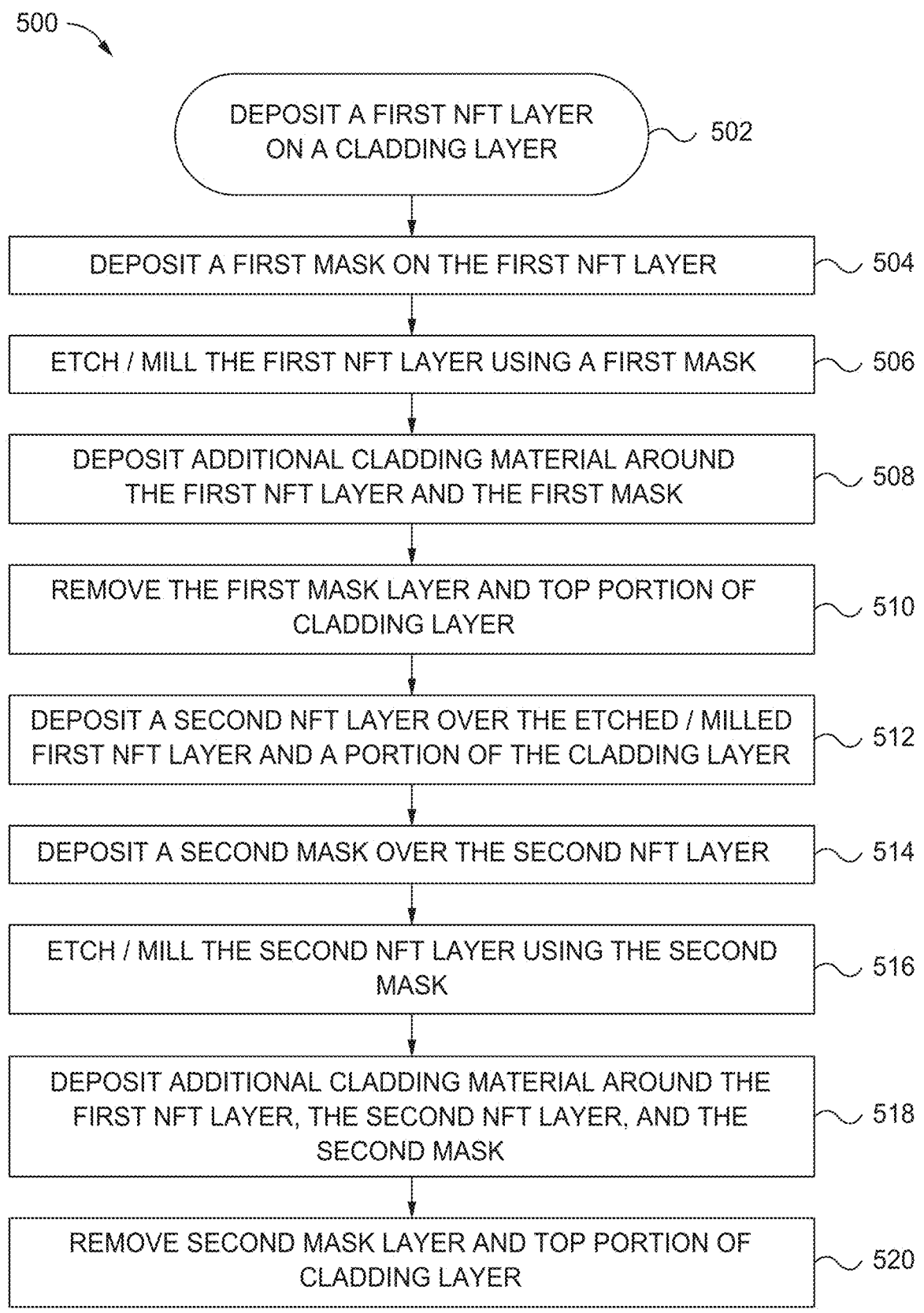

DEPOSIT A FIRST NFT LAYER ON A CLADDING LAYER — 502

DEPOSIT A FIRST MASK ON THE FIRST NFT LAYER — 504

ETCH / MILL THE FIRST NFT LAYER USING A FIRST MASK — 506

DEPOSIT ADDITIONAL CLADDING MATERIAL AROUND THE FIRST NFT LAYER AND THE FIRST MASK — 508

REMOVE THE FIRST MASK LAYER AND TOP PORTION OF CLADDING LAYER — 510

DEPOSIT A SECOND NFT LAYER OVER THE ETCHED / MILLED FIRST NFT LAYER AND A PORTION OF THE CLADDING LAYER — 512

DEPOSIT A SECOND MASK OVER THE SECOND NFT LAYER — 514

ETCH / MILL THE SECOND NFT LAYER USING THE SECOND MASK — 516

DEPOSIT ADDITIONAL CLADDING MATERIAL AROUND THE FIRST NFT LAYER, THE SECOND NFT LAYER, AND THE SECOND MASK — 518

REMOVE SECOND MASK LAYER AND TOP PORTION OF CLADDING LAYER — 520

FIG. 5

600A
MFS
602
Y
Z —→ X
606
608
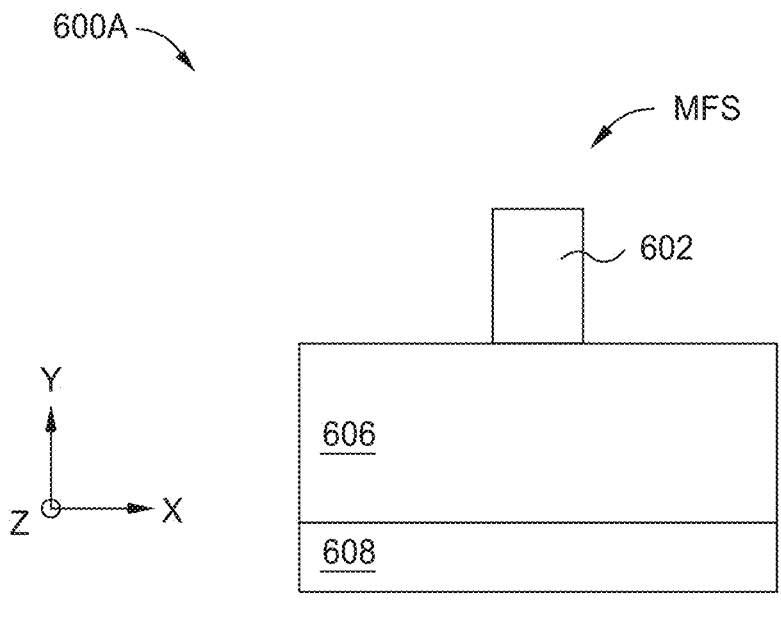
MFS VIEW
606
Y —→ X
Z
MFS VIEW
602
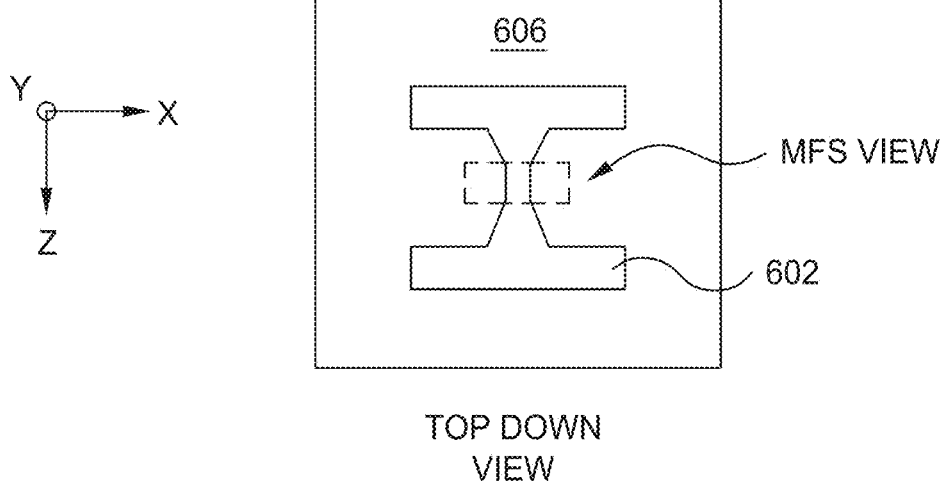
TOP DOWN
VIEW
FIG. 6A 600B
MFS
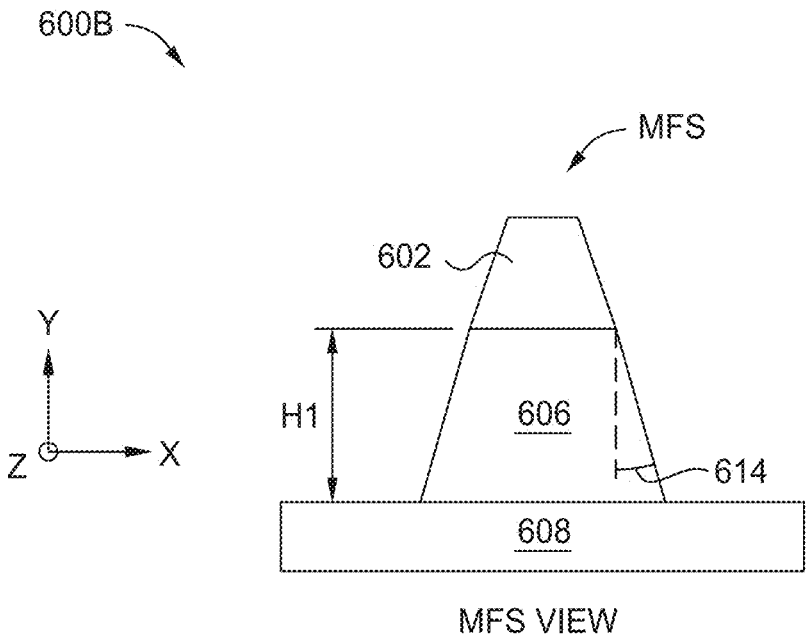
MFS VIEW
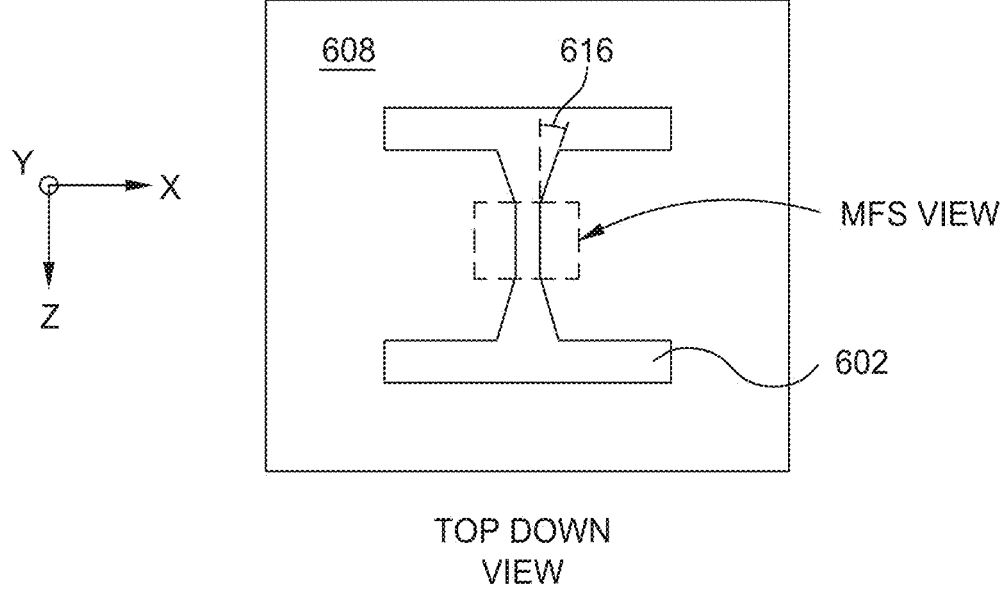
TOP DOWN
VIEW
FIG. 6B 600C
MFS
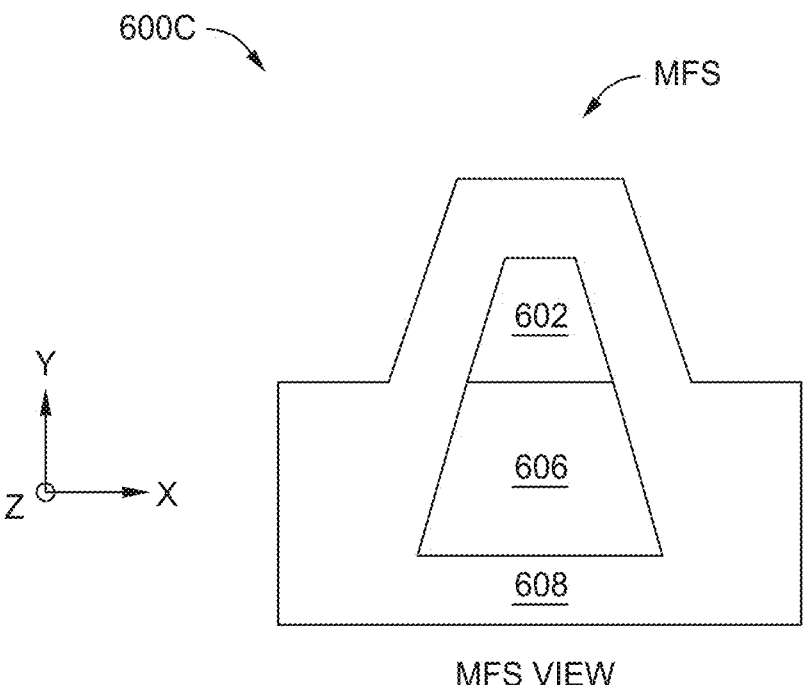
MFS VIEW
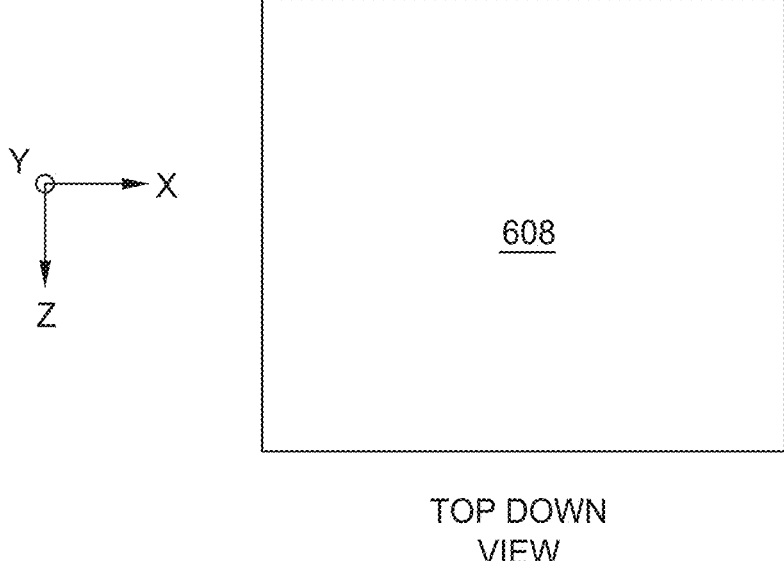
TOP DOWN
VIEW
FIG. 6C 600D
MFS
618
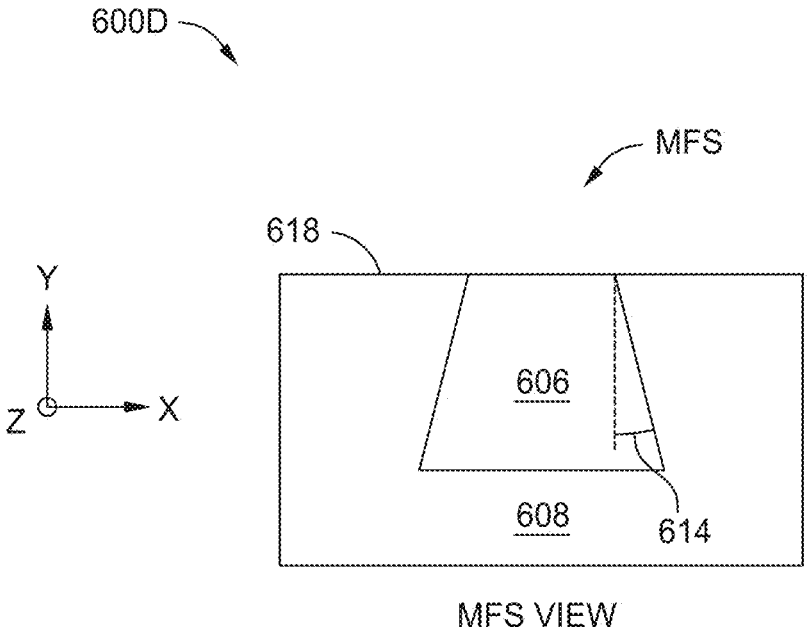
MFS VIEW
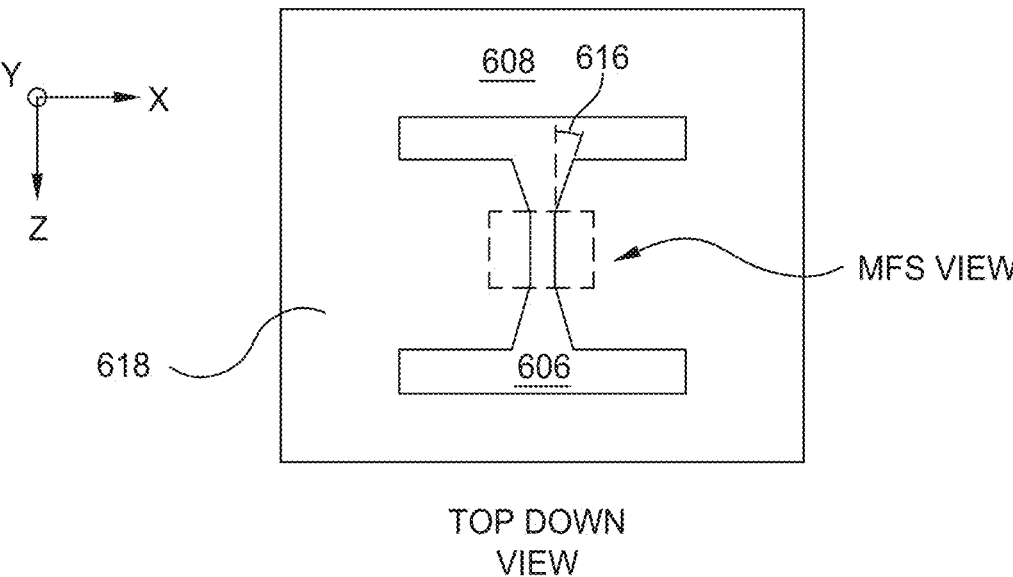
TOP DOWN
VIEW
FIG. 6D 600E
MFS
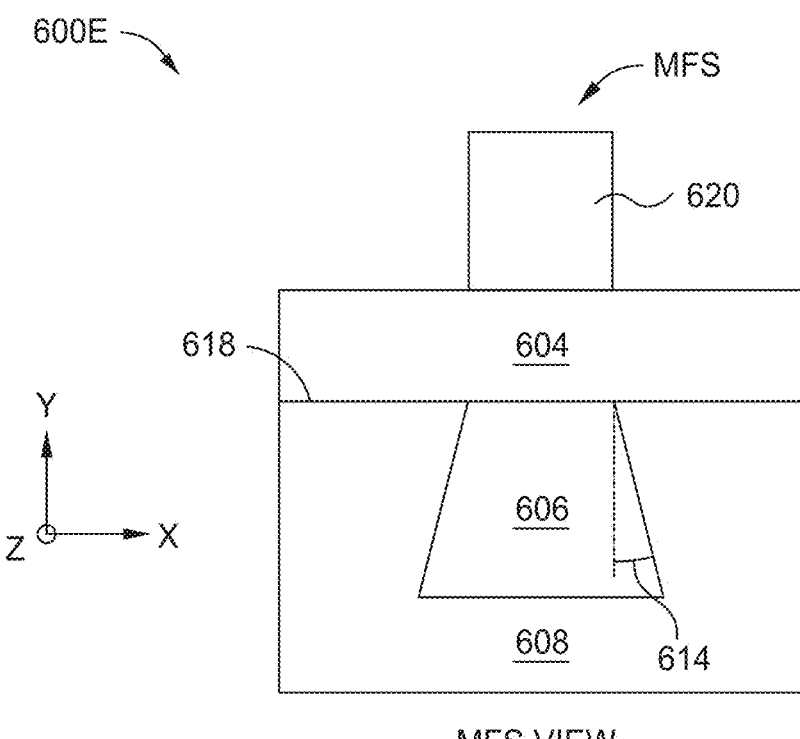
MFS VIEW
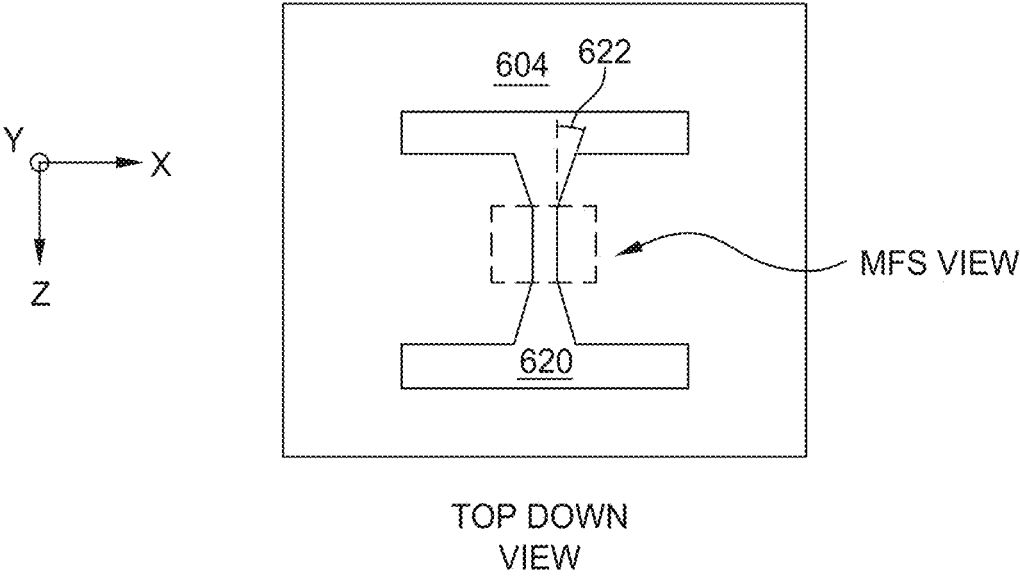
TOP DOWN
VIEW
FIG. 6E 600F
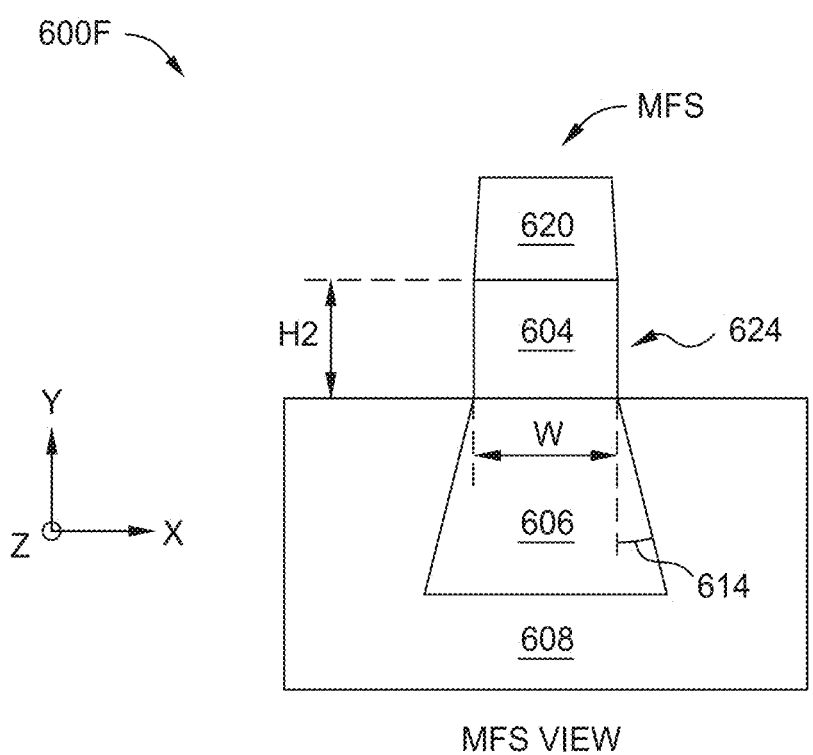
MFS VIEW
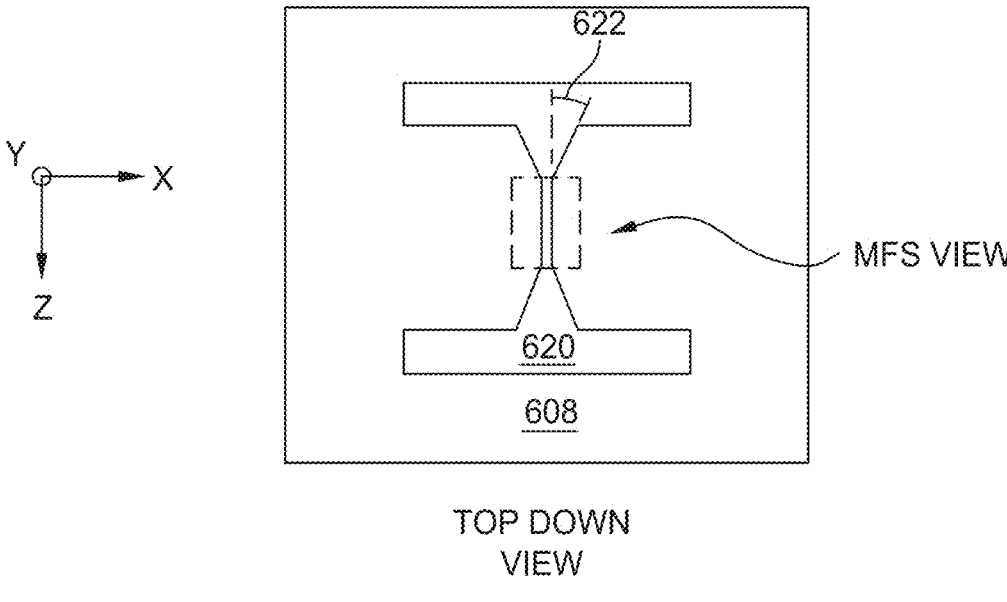
TOP DOWN
VIEW
FIG. 6F 600G
MFS
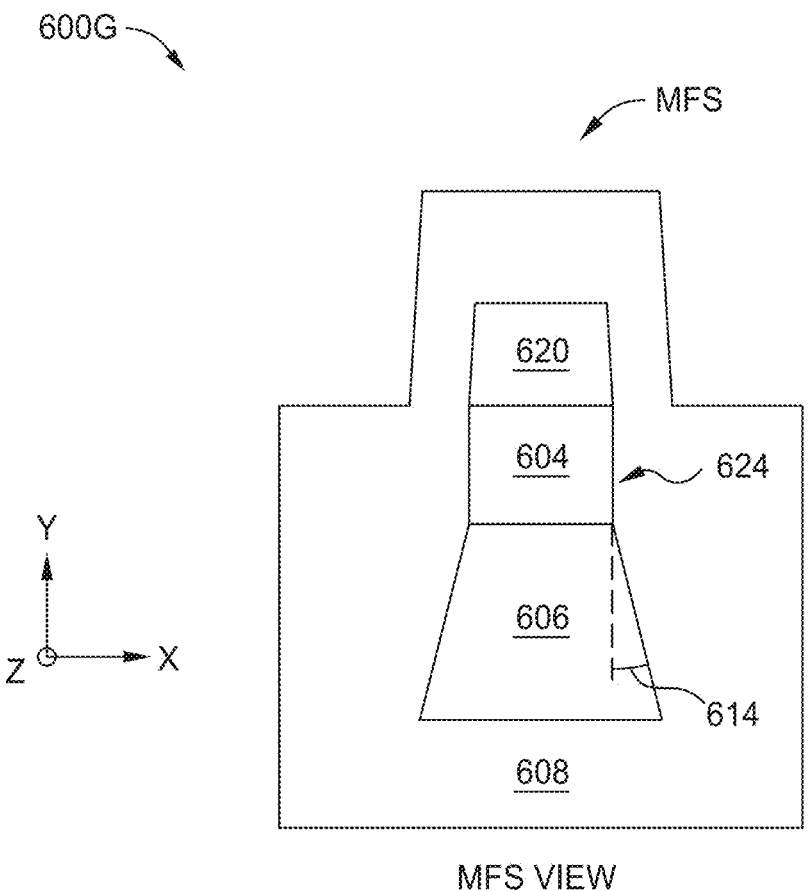
MFS VIEW
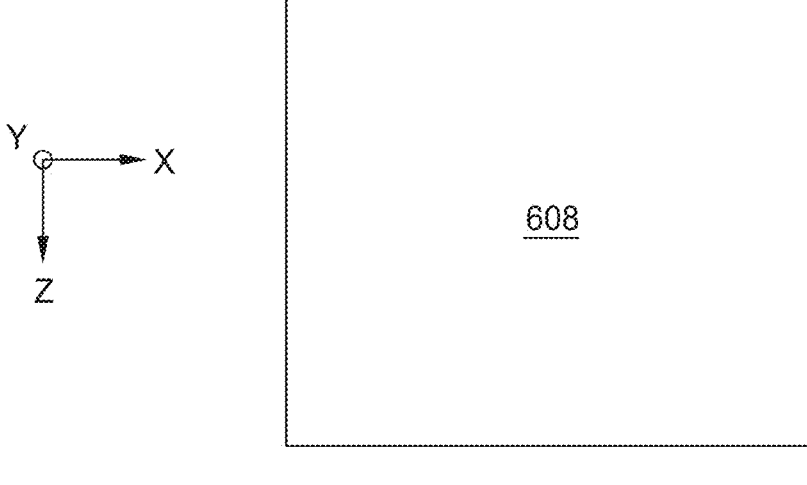
TOP DOWN
VIEW
FIG. 6G

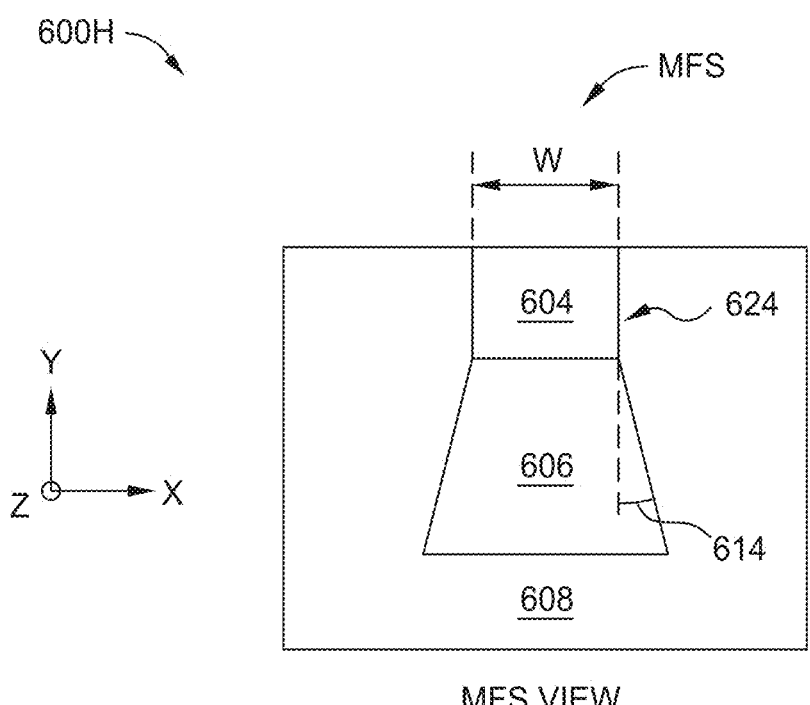
MFS VIEW
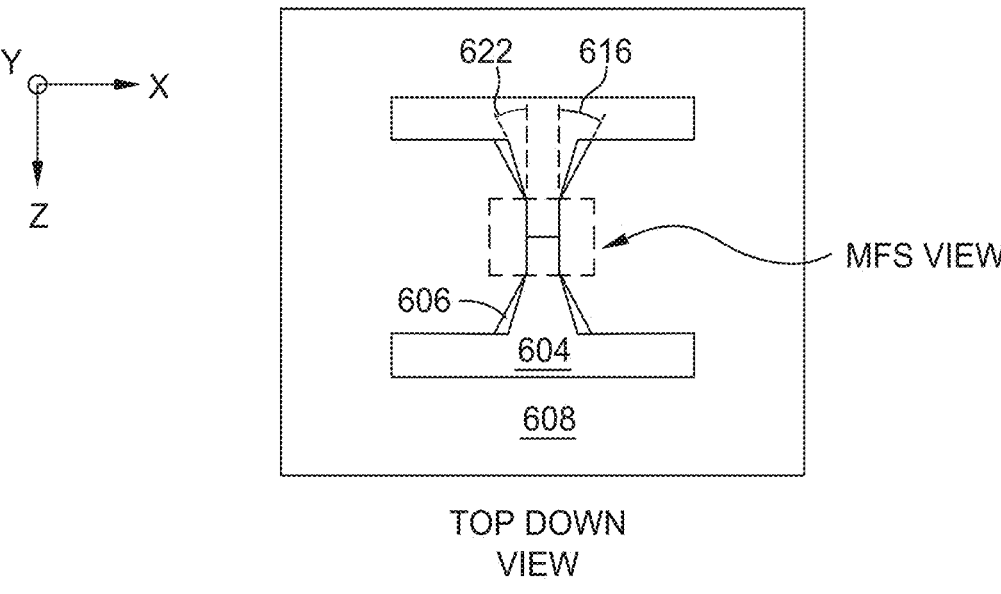
TOP DOWN
VIEW
FIG. 6H

MFS VIEW

MFS VIEW

DOUBLE-MASK NEAR-FIELD TRANSDUCER (NFT) AND METHOD THEREOF

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium.

Controlling critical features and dimensions of the NFT is important to achieving theoretical and consistent areal density capability (ADC) of HAMR. Current processes used to define many of these critical features and dimensions (e.g., a single mask process) limit the process capability (sigma) and independent control of different design features. As a result, there is a tradeoff between design, manufacturability, and increasing the areal density capacity (ADC) of HAMR devices.

Therefore, there is a need in the art for an improved HAMR magnetic media drive.

SUMMARY OF THE DISCLOSURE

A double mask process may be used to define layers of a NFT to enable independent control over each layer. Controlling critical features of the NFT, including the apex width, taper angles, and flare angles is important for achieving desired ADC of heat-assisted magnetic recording (HAMR) devices. By using a first mask to define a first layer of the NFT then a second mask to define a second layer of the NFT, limitations of the single mask NFT definition process may be overcome. For example, the limitation of using the same flare shape for both the first and the second NFT layers. Further, since the apex width of the NFT is defined by a separate mask, further scaling down of the apex width may also be achieved in a double mask NFT definition process.

In one embodiment, a magnetic recording head includes a main pole; a waveguide disposed adjacent to the main pole; and a near field transducer (NFT) coupled between the main pole and the waveguide at a media facing surface (MFS), wherein the NFT comprises: a first layer comprising a first surface facing the MFS, a second surface, and a third surface opposite the second surface, wherein the second and the third surfaces of the first layer are angled relative to a plane perpendicular to the MFS; and a second layer disposed over the first surface of the first layer, the second layer comprising a first surface facing the MFS, a second surface, and a third surface opposite the second surface, wherein the second and third surfaces of the second layer are angled relative to the plane perpendicular to the MFS, and wherein the angle of the second and third surfaces of the first layer relative to the plane perpendicular to the MFS and the angle of the second and third surfaces of the second layer relative to the plane perpendicular to the MFS are less than 90 degrees and are different from each other.

In another embodiment, a magnetic recording head includes a main pole; a waveguide disposed adjacent to the main pole; and a near field transducer (NFT) coupled between the main pole and the waveguide at a media facing surface (MFS), wherein the NFT comprises: a first layer comprising a first surface facing the MFS, a second surface, and a third surface opposite the second surface, wherein the second and the third surfaces of the first layer are angled less than 90 degrees relative to a plane perpendicular to the MFS; and a second layer disposed over a first surface of the first layer, the second layer comprising a first surface facing the MFS, a second surface, and a third surface opposite the second surface, wherein: the second and third surfaces of the second layer are angled relative to a plane perpendicular to the MFS; the angle of the second and third surfaces of the first layer relative to the plane perpendicular to the MFS is greater than the angle of the second and third surfaces of the second layer relative to the plane perpendicular to the MFS; and a flare angle of the first layer is less than a flare angle of the second layer.

In yet another embodiment, a method of defining a near field transducer (NFT) of a magnetic recording head, the method includes disposing a first mask onto a first surface of a first NFT layer, wherein the first surface is a media facing surface (MFS) of the first NFT layer; etching or milling a second surface and a third surface of the first NFT layer using the first mask, wherein the second surface is opposite the third surface of the first NFT layer; removing the first mask; disposing a second NFT layer over the first surface of the first NFT layer, wherein the second NFT layer comprises a first surface facing the MFS, a second surface, and a third surface opposite the second surface of the second NFT layer; disposing a second mask over the first surface of the second NFT layer; etching or milling the second and third surfaces of the second NFT layer using the second mask; and removing the second mask.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a flowchart illustrating a double mask NFT definition process, according to one or more embodiments.

FIGS. 6A-6H illustrates various cross-sectional views of a NFT defined by the NFT definition process of FIG. 5, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A double mask process may be used to define layers of an NFT to enable independent control over each layer. Controlling critical features of the NFT, including the apex width, taper angles, and flare angles is important for achieving desired ADC of heat-assisted magnetic recording HAMR devices. By using a first mask to define a first layer of the NFT, then a second mask to define a second layer of the NFT, limitations of the single mask NFT definition process may be overcome. For example, the limitation of using the same flare shape for both the first and the second NFT layers. Further, since the apex width of the NFT is defined by a separate mask, further scaling down of the apex width may also be achieved in a double mask NFT definition process.

Figure 1:
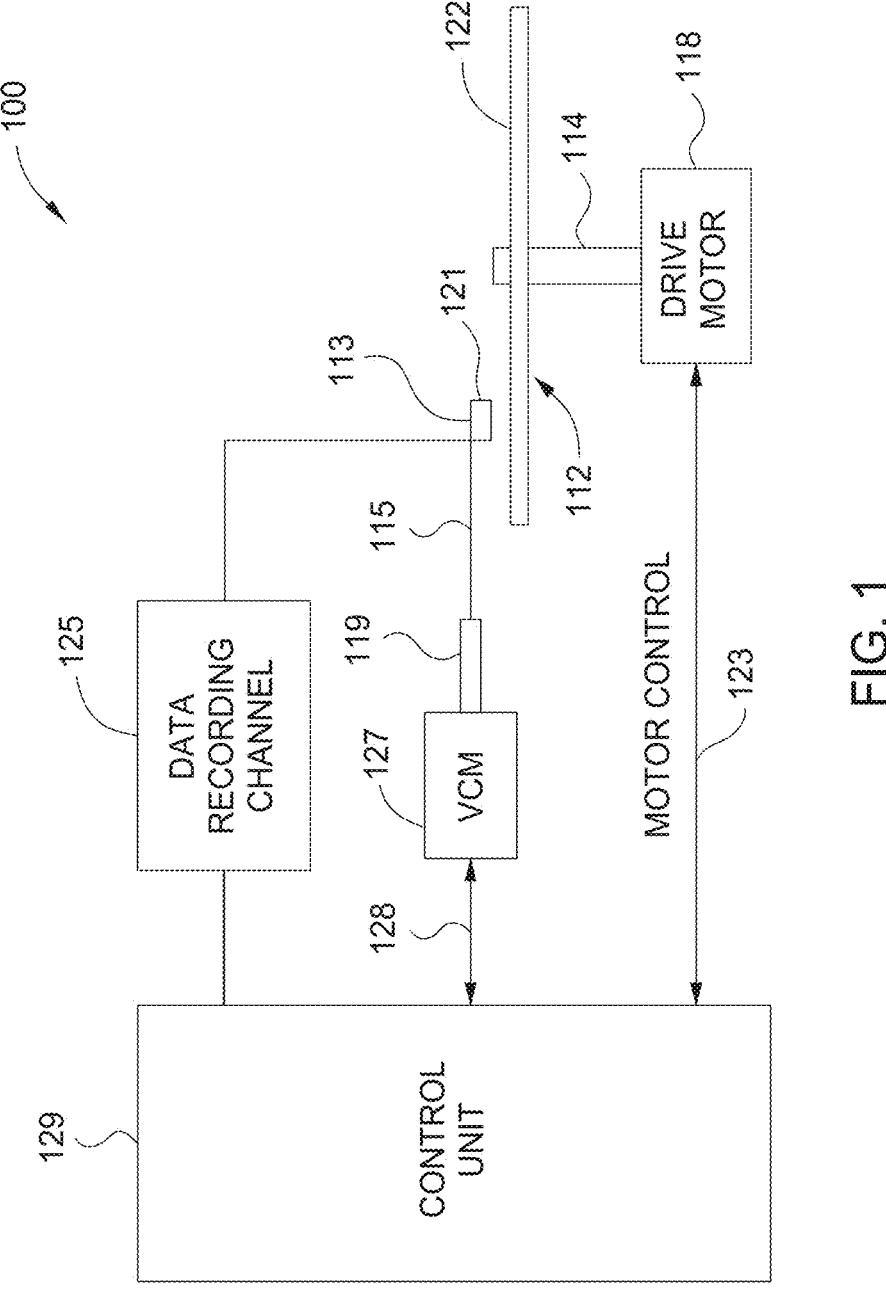
FIG. 1 is a schematic illustration of certain embodiments of a magnetic media drive including a HAMR magnetic write head, according to one or more embodiments of the disclosure.

FIG. 1 is a schematic illustration of certain embodiments of a magnetic media drive 100 including an energy-assisted magnetic recording (EAMR) write head, such as a heat-assisted magnetic recording (HAMR) or microwave assisted magnetic recording (MAMR) write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as driving motor control signals on line 123 and head position and seeking control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
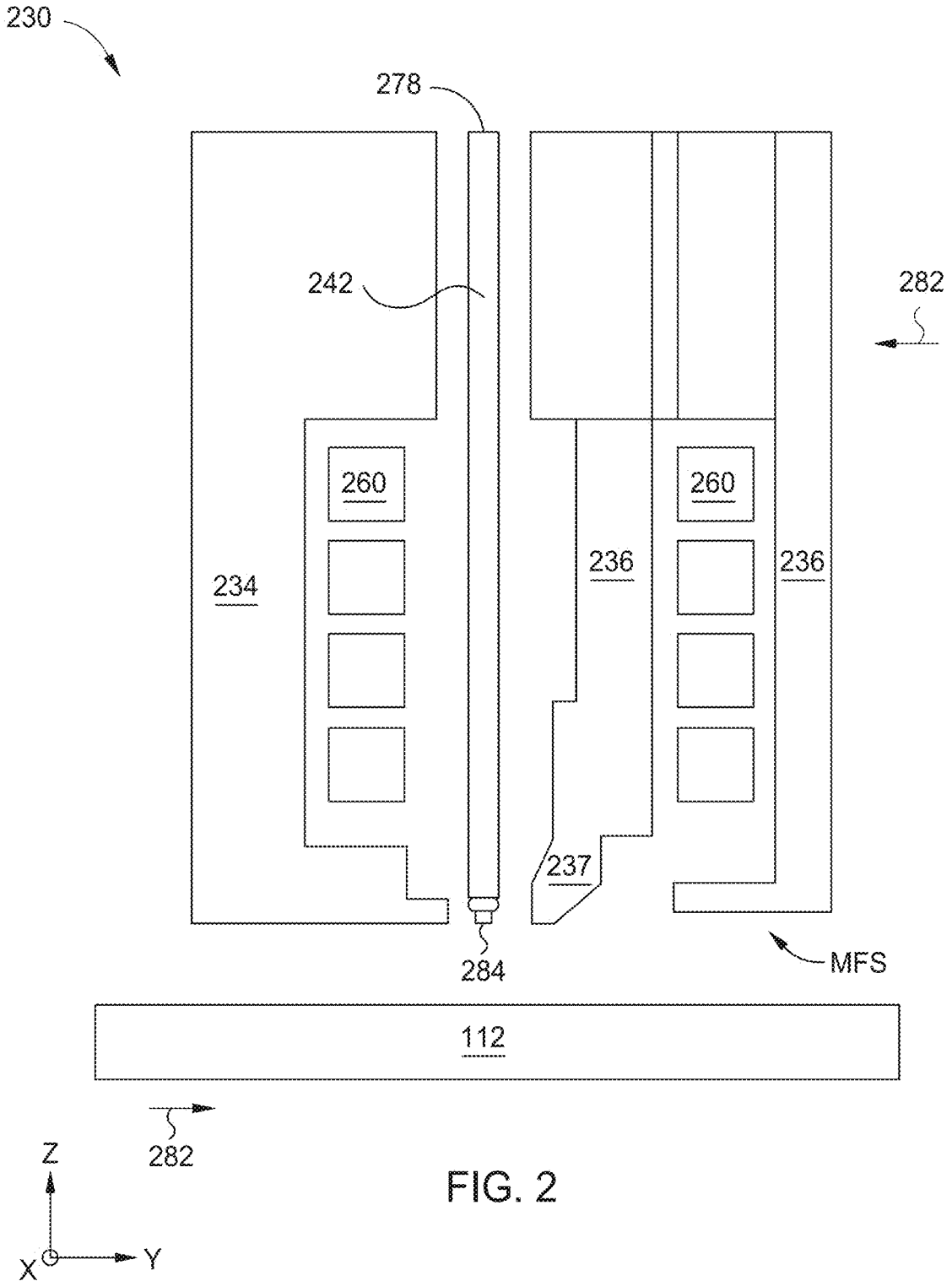
FIG. 2 is a schematic illustration of certain embodiments of a cross-sectional side view of a HAMR write head facing a magnetic disk, according to one or more embodiments of the disclosure.

FIG. 2 is a schematic illustration of certain embodiments of a cross-sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can include a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

The waveguide 242, may be a spot size converter (SSC) that includes numerous waveguides and a multimodal interference (MMI) device. The present disclosure generally relates to the management and enhancement of the profile of the SSC. The SSC discussed herein results in significant improvement in the overall coupling efficiency between a coherent light source and the waveguide inside a photonic integrated circuit (PIC) or planar waveguide circuit (PLC) of a HAMR head slider. The geometry and position of the core materials/assist core channels both on the lateral and vertical vicinity of a center waveguide core are discussed herein. The overall field profile of the SSC can be tuned to match the field profile or the mode of a coherent light source, leading to significant enhancement in the overall coupling efficiency.

Optical power from an external coherent light source (i.e., EELD, surface emitting diode laser, VCSEL device, or fiber coupled diode laser) is coupled into the PLC of the HAMR head slider through the SSC or mode converter. The basic design concept is to match the mode profile of the incoming light source and the mode profile of the PLC, both at the coupling interface, hence maximizing the overall coupling efficiency.

Figure 3:
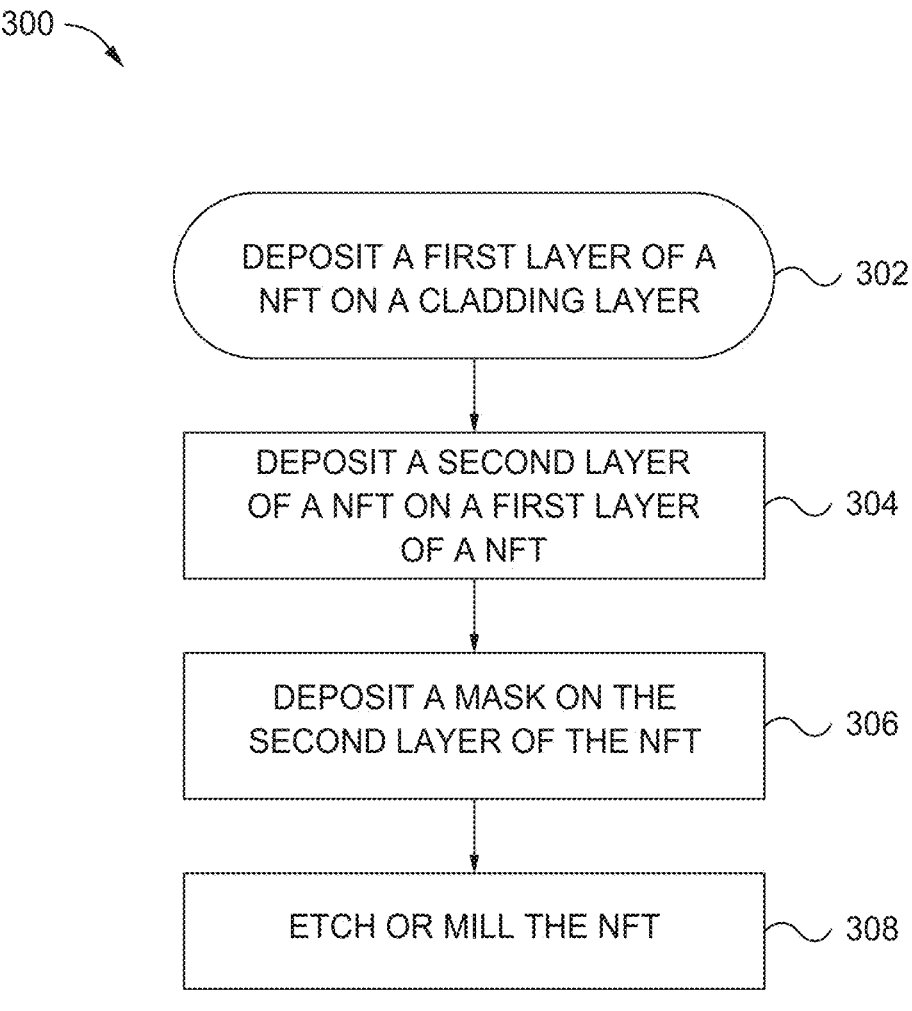
FIG. 3 is a flowchart illustrating a single mask NFT definition process, according to one or more embodiments.
Figure 4A:
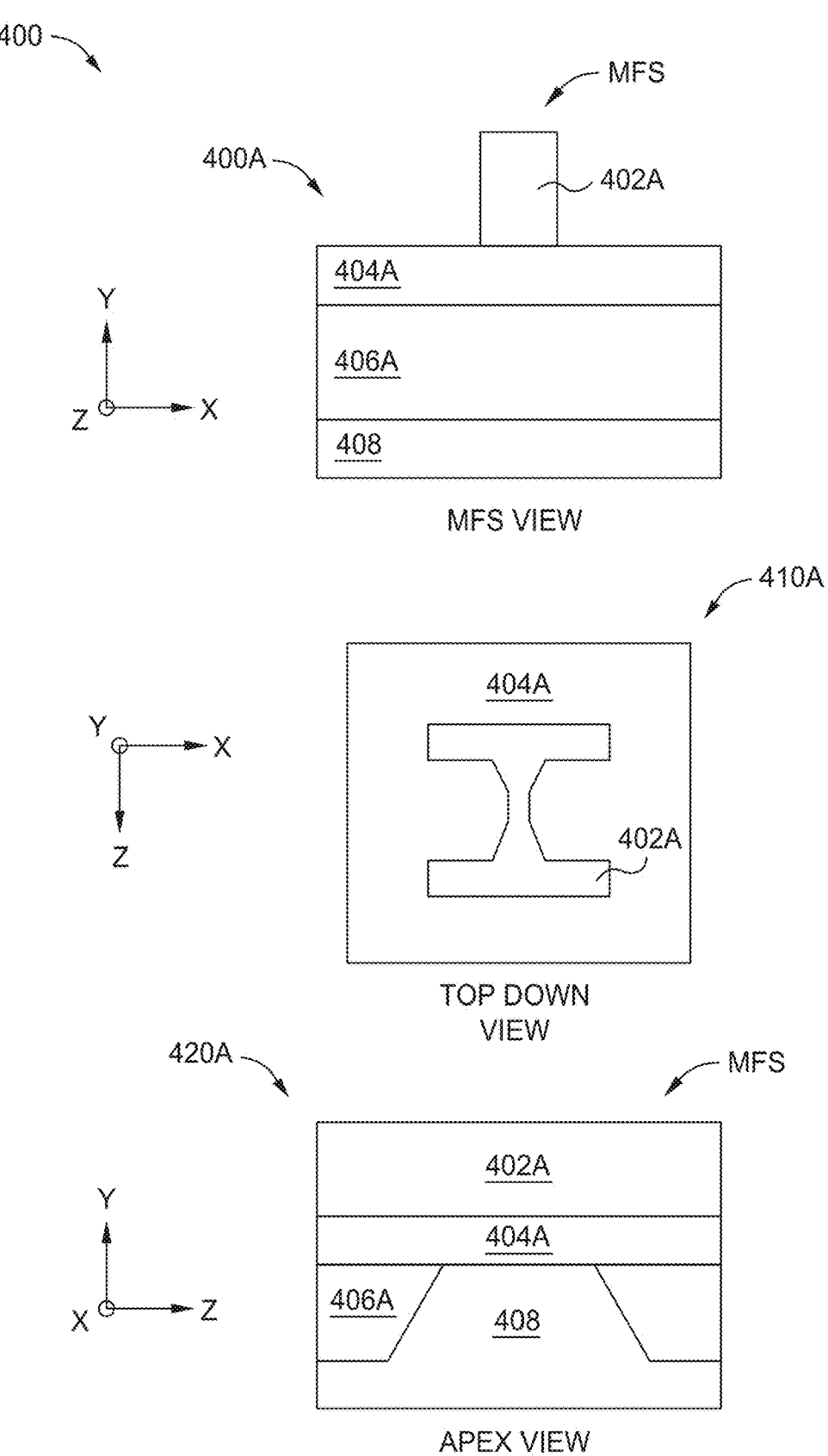
FIGS. 4A-4B illustrates various cross-sectional views of a NFT defined by the single mask NFT definition process of FIG. 3, according to one or more embodiments.
Figure 4B:
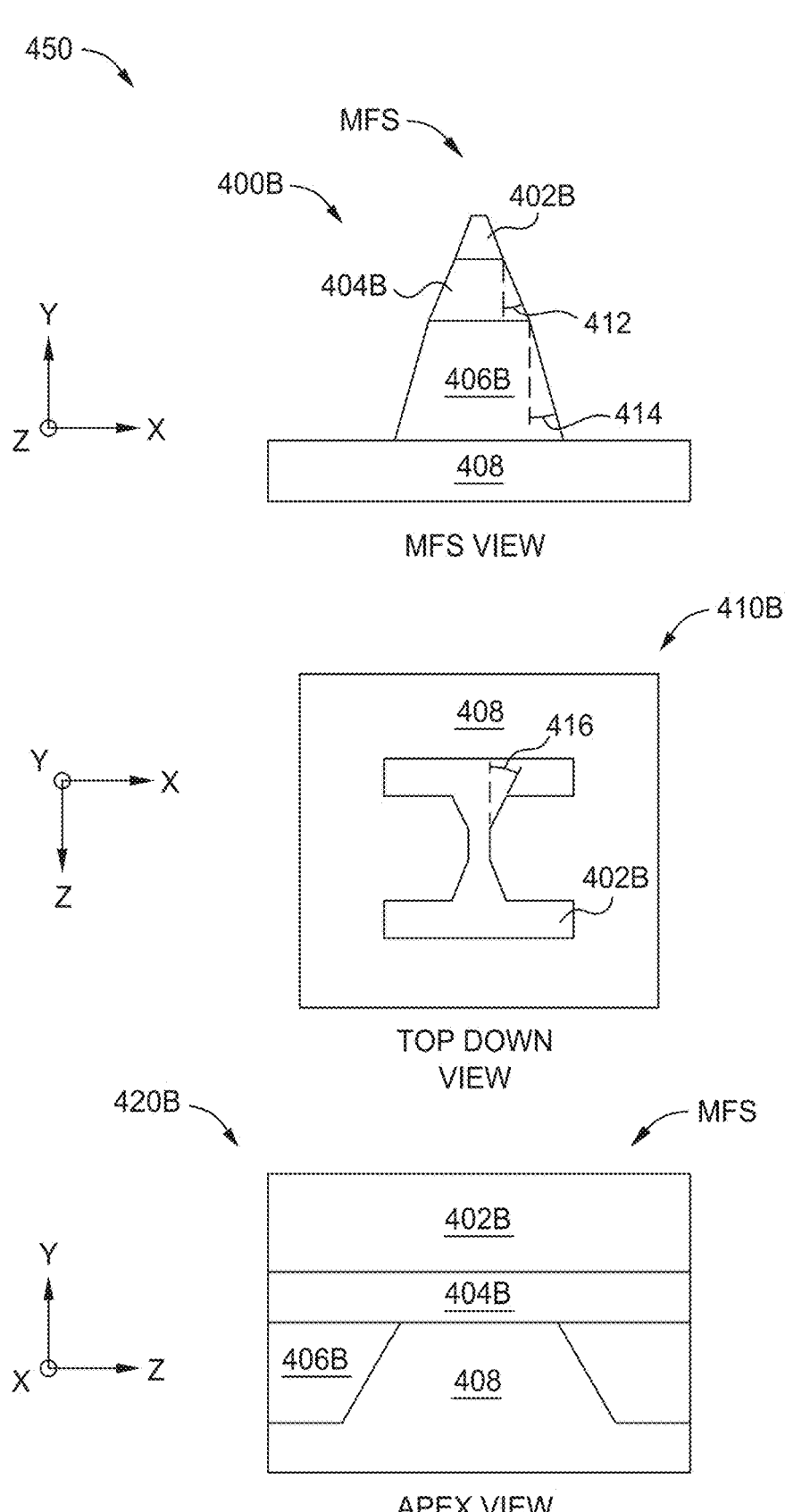

FIG. 3 is a flowchart illustrating a conventional single mask NFT definition process 300. FIGS. 4A-4B illustrate various cross-sectional views of NFTs 400, 450 defined by the NFT definition process 300 of FIG. 3, according to one or more embodiments. It should be noted that although the NFT definition process 300 illustrated in FIG. 3 is described sequentially, NFT definition process 300 may include other process sequences including one or more operations that have been omitted and/or added, and/or rearranged in another desirable order. Such one or more operations that have been omitted and/or added, and/or rearranged fall within the scope of the embodiments of the disclosure provided herein. In some embodiments, NFT 450 is formed from NFT 400 via a single mask NFT definition process (e.g., NFT definition process 300). In some embodiments, NFT 284 of FIG. 2 is an implementation of NFT 450. NFT 400A, 410A, and 420A are a MFS view, a top-down view, and apex view of NFT 400, respectively. NFT 400B, 410B, and 420B are a MFS view, a top-down view, and apex view of NFT 450, respectively.

Single mask NFT definition process 300 begins at operation 302, where a first NFT layer 406A is deposited over a cladding layer 408. At operation 304, a second NFT layer 404A is deposited over the first NFT layer 406A. At operation 306, as shown in NFT 400 of FIG. 4A, a mask 402A (e.g., a hard mask) is deposited over the second NFT layer 404A. At operation 308, as shown in NFT 450 of FIG. 4B, NFT 400 is etched or milled to form NFT 450, including first NFT layer 406B, second NFT layer 404B, and mask 402B. In some embodiments, the taper angle 412 of the second NFT layer 404B relative to the y-axis and the taper angle 414 of the first NFT layer 406B relative to the y-axis are the same. In some embodiments, the taper angle 412 of the second NFT layer 404B relative to the y-axis and the taper angle 414 of the first NFT layer 406B relative to the y-axis is less than or equal to 40 degrees. In some embodiments, the flare angle (FA) 416 of mask 402B relative to the z-axis of NFT 450 is less than or equal to 75 degrees. As a result of the single mask NFT definition process, the FA 416 of mask 402B relative to the z-axis is translated to both the first NFT layer 406B and the second NFT layer 404B, such that the first NFT layer 406B and the second NFT layer 404B have the same FA.

A double mask NFT definition process (e.g., the NFT definition process 500 of FIG. 5) breaks down NFT definition into two separate layers. The first NFT layer is defined with a pattern transfer process and the first mask enables control over the first NFT layer's first flare angle, flare shape, and taper angle relative to the y-axis. After the first NFT layer's planarity is complete (i.e., the MFS of the first NFT layer is planarized) and a second NFT layer is disposed over the first NFT layer, a second, separate mask is disposed over the second NFT layer to further enable control over the second NFT layer's flare angle, flare shape, apex width, and taper angle relative to the y-axis. Since the layers can be defined with 2 different masks, the flare shape of both layers may be independently shaped thus removing the limitation of using the same flare shape for both layers. Moreover, since the apex width of the second NFT layer is defined using the second mask only, further scaling down of the apex width by reducing the complexity of defining both the taper angle relative to the y-axis of the first and second NFT layer and apex width may be achieved versus in a single mask NFT definition process.

FIG. 5 is a flowchart illustrating a double mask NFT definition process 500, according to one or more embodiments. FIGS. 6A-6H illustrate various cross-sectional views (i.e., a MFS view and a top-down view) of NFTs 600A, 600B, 600C, 600D, 600E, 600F, 600G, 600H defined by a double mask NFT definition process (e.g., the NFT definition process 500 of FIG. 5). It should be noted that although the NFT definition process 500 illustrated in FIG. 5 is described sequentially, NFT definition process 500 may include other process sequences such as one or more operations that have been omitted and/or added, and/or rearranged in another desirable order. Such one or more operations that have been omitted and/or added, and/or rearranged fall within the scope of the embodiments of the disclosure provided herein. In some embodiments, NFT 284 of FIG. 2 is an implementation of NFT 600H.

Double mask NFT definition process 500 begins at operation 502, e.g. as shown in NFT 600A of FIG. 6A, where a first NFT layer 606 is disposed over cladding layer 608. At operation 504, e.g. as shown in NFT 600A of FIG. 6A, a first mask 602 is disposed over the first NFT layer 606. At operation 506, e.g. as shown in NFT 600B of FIG. 6B, the first NFT layer 606 is etched or milled using the first mask 602.

First NFT layer 606 is etched or milled to have a taper angle 614 relative to the y-axis. In some embodiments, taper angle 614 is between about 0 degrees to about 45 degrees, such as between about 0 degrees to about 35 degrees, such as between about 0 degrees to about 30 degrees, such as 20 degrees. In some embodiments, the height (H1) of the first NFT layer 606 is between about 30 nanometers (nm) to about 100 nm, such as between about 40 nm to about 90 nm, such as between about 50 nm to about 80 nm, such as between about 50 nm to about 70 nm. In some embodiments, the first mask 602 has a flare angle 616 relative to the z-axis that is translated to the first NFT layer 606 during the etching or milling. As a result, the flare angle 616 of the first NFT layer 606 relative to the z-axis is between about 0 degrees to about 80 degrees, such as between about 0 degrees to about 70 degrees, such as between about 0 degrees to about 65 degrees, such as 55 degrees.

At operation 508, e.g. as shown in NFT 600C of FIG. 6C, additional cladding material 608 is disposed around the first NFT layer 606 and the first mask 602 so that cladding layer 608 encloses the first NFT layer 606 and first mask 602. At operation 510, e.g. as shown in NFT 600D of FIG. 6D, a MFS portion of the cladding layer 608 and the first mask 602 are removed exposing surface 618 of NFT 600D, including a MFS of the cladding layer 608 and a MFS of the first NFT layer 606. It is to be noted that the MFS portion of the cladding layer 608 and the first mask 602 is removed such that the height (H1) of the first NFT layer 606 after operation 506 is maintained. In some embodiments, first NFT layer 606 has a taper angle 614 and flare angle 616.

At operation 512, e.g. as shown in NFT 600E of FIG. 6E, a second NFT layer 604 is disposed over surface 618 of the NFT 600D—i.e., the second NFT layer 604 is disposed over the MFS portion of the cladding layer 608 and first NFT layer 606 exposed by operation 510. At operation 514, e.g. as shown in NFT 600E of FIG. 6E, second mask 620 is further disposed over an MFS of the second NFT layer 604 to form NFT 600E. In some embodiments, the second mask 620 has a flare angle 622 relative to the z-axis that is translated to the second NFT layer 604 during operation 516.

At operation 516, e.g. as shown in NFT 600F of FIG. 6F, the second NFT layer 604 is etched or milled to have a taper angle 624 relative to the y-axis. In some embodiments, taper angle 624 is between about 0 degrees to about 60 degrees, such as between about 0 degrees to about 55 degrees, such as between about 0 degrees to about 45 degrees, such as between about 0 degrees to about 30 degrees, such as between about 0 degrees to about 20 degrees, such as between about 0 degrees to about 10 degrees, such as less than 10 degrees, such as 5 degrees. In some embodiments, the height (H2) of the second NFT layer 604 is between about 50 nanometers nm to about 120 nm, such as between about 60 nm to about 110 nm, such as between about 70 nm to about 100 nm. In some embodiments, the second mask has a flare angle 622 that is translated to the second NFT layer 604 via the etching or milling. As a result, the flare angle 622 of the second NFT layer 604 relative to the z-axis is between about 0 degrees to about 80 degrees, such as between about 0 degrees to about 70 degrees, such as between about 0 degrees to about 65 degrees, such as 45 degrees. In some embodiments, a width (W) (i.e., an apex width) of the second NFT layer 604 is between about 10 nm to about 50 nm.

At operation 518, e.g. as shown in NFT 600G of FIG. 6G, additional cladding material 608 is disposed around the first NFT layer 606, second NFT layer 604, and the second mask 620 such that cladding layer 608 encloses the first NFT layer 606, second NFT layer 604, and the second mask 620. At operation 520, e.g. as shown in NFT 600H of FIG. 6H, a MFS portion of the cladding layer 608 and the second mask 620 is removed exposing a MFS of the cladding layer 608 and a MFS of the second NFT layer 604. It is to be noted that the MFS portion of the cladding layer 608 and the first mask 602 is removed in a manner such that the height (H2) of the second NFT layer 604 after operation 516 is maintained.

In some embodiments, the NFT layers (e.g., the first NFT layer 606 and/or second NFT layer 604) comprise gold (Au), rhodium (Rh), iridium (Ir), or a combination thereof. In some embodiments, the cladding layer(s) (e.g., cladding layer 608) comprises of an oxygen containing material (i.e., an oxide). In some embodiments, the cladding layer(s) (e.g., cladding layer 608) comprises $SiO_2$, $AlO_x$, $TaO_x$, Au, Rh, Ir, or combination thereof.

Figure 7:
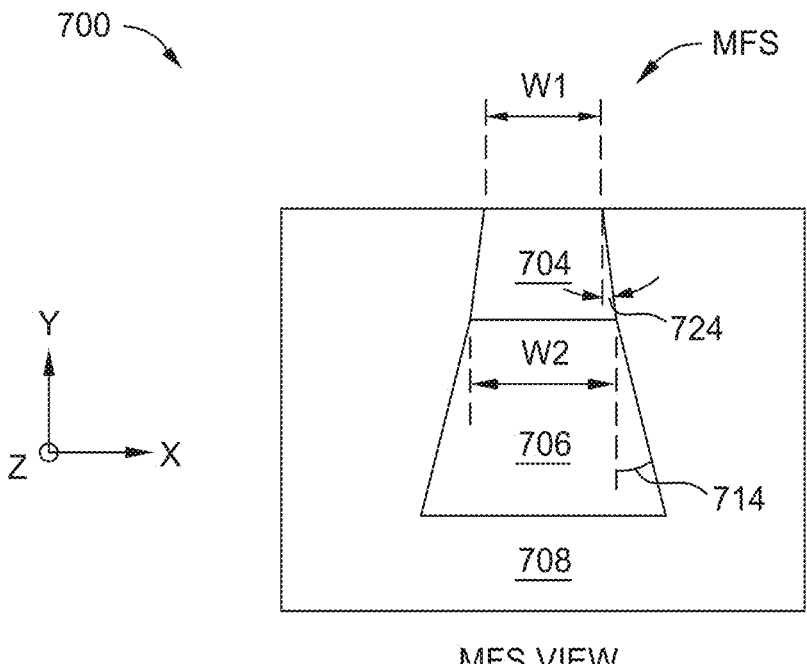
FIG. 7 illustrates a cross-sectional view of a NFT, according to one or more embodiments.

FIG. 7 illustrates a MFS view of a NFT 700 formed using a double mask NFT definition process (e.g., double mask NFT definition process 500), according to one embodiment. In some embodiments, NFT 284 of FIG. 2 is an implementation of NFT 700. NFT 700 may comprise the same materials as the NFT 600H of FIG. 6H. NFT 700 comprises first NFT layer 706 and second NFT layer 704, which are surrounded by cladding layer 708 except for on a MFS of the second NFT layer 704 (i.e., the MFS of the second NFT layer 704 is exposed). In some embodiments, first NFT layer 606 of FIGS. 6A-6H may be implemented as first NFT layer 706 but having taper angle 714 relative to the y-axis. In some embodiments, second NFT layer 604 of FIGS. 6E-6H may be implemented as second NFT layer 704 but having taper angle 724 relative to the y-axis. In some embodiments, taper angle 724 is less than taper angle 714. In some embodiments, an apex width (W1) of the second NFT layer 704 is less the apex width (W2) of the first NFT layer 706.

Figure 8:
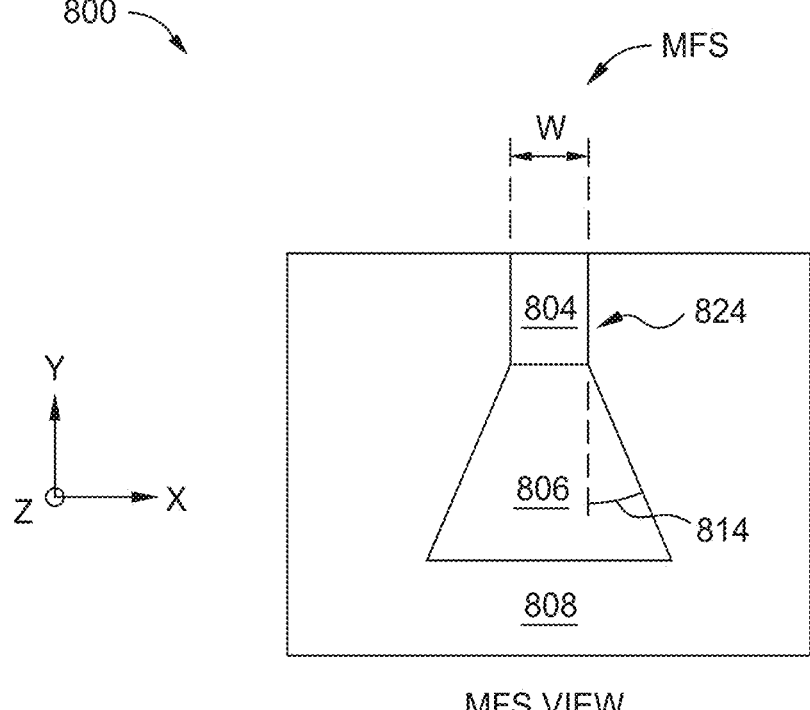
FIG. 8 illustrates a cross-sectional view of a NFT, according to one or more embodiments.

FIG. 8 illustrates a MFS view of an NFT 800 formed using a double mask NFT definition process (e.g., double mask NFT definition process 500), according to another embodiment. In some embodiments, NFT 284 of FIG. 2 is an implementation of NFT 800. NFT 800 may comprise the same materials as the NFT 600H of FIG. 6H. NFT 800 comprises first NFT layer 806 and second NFT layer 804, which are surrounded by cladding layer 808 except for an MFS of the second NFT layer 804. In some embodiments, first NFT layer 606 of FIGS. 6A-6H may be implemented as first NFT layer 806 but having taper angle 814 relative to the y-axis. In some embodiments, second NFT layer 604 of FIGS. 6E-6H may be implemented as second NFT layer 804 but having taper angle 724 relative to the y-axis. In some embodiments, a width (i.e., apex width) of the second NFT layer 804 is less than 50 nm, such as less than 40 nm, such as less than 30 nm, such as less than 20 nm, such as about 10 nm.

By using a double mask process to define a NFT, limitations of the single mask NFT definition process may be overcome. For example, the limitation of using the same flare shape for both the first and the second NFT layers. Further, since the apex width of the NFT is defined by a separate mask, further scaling down of the apex width may also be achieved in a double mask NFT definition process.

In one embodiment, a magnetic recording head includes a main pole; a waveguide disposed adjacent to the main pole; and a near field transducer (NFT) coupled between the main pole and the waveguide at a media facing surface (MFS), wherein the NFT comprises: a first layer comprising a first surface facing the MFS, a second surface, and a third surface opposite the second surface, wherein the second and the third surfaces of the first layer are angled relative to a plane perpendicular to the MFS; and a second layer disposed over the first surface of the first layer, the second layer comprising a first surface facing the MFS, a second surface, and a third surface opposite the second surface, wherein the second and third surfaces of the second layer are angled relative to the plane perpendicular to the MFS, and wherein the angle of the second and third surfaces of the first layer relative to the plane perpendicular to the MFS and the angle of the second and third surfaces of the second layer relative to the plane perpendicular to the MFS are less than 90 degrees and are different from each other.

The angle of the second and third surfaces of the first layer is greater than the angle of the second and third surfaces of the second layer. The angle of the second and third surfaces of the first layer is less than 45 degrees and the angle of the second and third surfaces of the second layer is 0 degrees. The angle of the second and third surfaces of the first layer is less than 45 degrees and the angle of the second and third surfaces of the second layer is greater than about 0 degrees. A height of the first layer is between 50 nanometers (nm) to 70 nm. A height of the second layer is between 70 nm to 100 nm. A width of the second layer along the MFS is between 10 nanometers (nm) to 50 nm. A flare angle of the first layer is less than 65 degrees, and wherein a flare angle of second layer is less than 65 degrees. A flare angle of the first layer is less than a flare angle of the second layer. The flare angle of the first layer is 45 degrees, and the flare angle of the second layer is 55 degrees. A magnetic recording drive comprising the magnetic recording head.

In another embodiment, a magnetic recording head includes a main pole; a waveguide disposed adjacent to the main pole; and a near field transducer (NFT) coupled between the main pole and the waveguide at a media facing surface (MFS), wherein the NFT comprises: a first layer comprising a first surface facing the MFS, a second surface, and a third surface opposite the second surface, wherein the second and the third surfaces of the first layer are angled less than 90 degrees relative to a plane perpendicular to the MFS; and a second layer disposed over a first surface of the first layer, the second layer comprising a first surface facing the MFS, a second surface, and a third surface opposite the second surface, wherein: the second and third surfaces of the second layer are angled relative to a plane perpendicular to the MFS; the angle of the second and third surfaces of the first layer relative to the plane perpendicular to the MFS is greater than the angle of the second and third surfaces of the second layer relative to the plane perpendicular to the MFS; and a flare angle of the first layer is less than a flare angle of the second layer.

The angle of the second and third surfaces of the first layer is less than 45 degrees and the angle of the second and third surfaces of the second layer is less than 30 degrees. A width of the first surface of the second layer along the MFS is between 10 nm to 50 nm. The flare angle of the first layer is less than 65 degrees, and wherein the flare angle of second layer is less than 65 degrees. A magnetic recording drive comprising the magnetic recording head.

In yet another embodiment, a method of defining a near field transducer (NFT) of a magnetic recording head, the method includes disposing a first mask onto a first surface of a first NFT layer, wherein the first surface is a media facing surface (MFS) of the first NFT layer; etching or milling a second surface and a third surface of the first NFT layer using the first mask, wherein the second surface is opposite the third surface of the first NFT layer; removing the first mask; disposing a second NFT layer over the first surface of the first NFT layer, wherein the second NFT layer comprises a first surface facing the MFS, a second surface, and a third surface opposite the second surface of the second NFT layer; disposing a second mask over the first surface of the second NFT layer; etching or milling the second and third surfaces of the second NFT layer using the second mask; and removing the second mask.

The etching or milling of the first NFT layer comprises angling the second and third surfaces of the first NFT layer to a first angle less than 90 degrees relative to a plane perpendicular to the MFS; the etching or milling of the second NFT layer comprises angling the second and third surfaces of the second NFT layer to a second angle less than 90 degrees relative to the plane perpendicular to the MFS; and the first angle is greater than the second angle. The etching or milling of the first NFT layer comprises angling the second and third surfaces of the first NFT layer to an angle less than 45 degrees relative to a plane perpendicular to the MFS; and the etching or milling of the second NFT layer comprises angling the second and third surfaces of the second NFT layer to an angle less than 30 degrees relative to a plane perpendicular to the MFS. A flare angle of the first NFT layer is less than a flare angle of the second NFT layer. A magnetic recording drive comprising the magnetic recording head formed by the method.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head, comprising:
a main pole;
a waveguide disposed adjacent to the main pole; and a near field transducer (NFT) coupled between the main pole and the waveguide at a media facing surface (MFS), wherein the NFT comprises:

a first layer comprising a first surface facing the MFS, a second surface, and a third surface opposite the second surface, wherein the second and the third surfaces of the first layer are angled relative to a plane perpendicular to the MFS; and a second layer disposed over the first surface of the first layer, the second layer comprising a first surface facing the MFS, a second surface, and a third surface opposite the second surface, wherein the second and third surfaces of the second layer are angled relative to the plane perpendicular to the MFS, and wherein the angle of the second and third surfaces of the first layer relative to the plane perpendicular to the MFS and the angle of the second and third surfaces of the second layer relative to the plane perpendicular to the MFS are less than 90 degrees and are different from each other.

2. The magnetic recording head of claim 1, wherein the angle of the second and third surfaces of the first layer is greater than the angle of the second and third surfaces of the second layer.

3. The magnetic recording head of claim 1, wherein the angle of the second and third surfaces of the first layer is less than 45 degrees and the angle of the second and third surfaces of the second layer is 0 degrees.

4. The magnetic recording head of claim 1, wherein the angle of the second and third surfaces of the first layer is less than 45 degrees and the angle of the second and third surfaces of the second layer is greater than about 0 degrees.

5. The magnetic recording head of claim 1, wherein a height of the first layer is between 50 nanometers (nm) to 70 nm.

6. The magnetic recording head of claim 5, wherein a height of the second layer is between 70 nm to 100 nm.

7. The magnetic recording head of claim 1, wherein a width of the second layer along the MFS is between 10 nanometers (nm) to 50 nm.

8. The magnetic recording head of claim 1, wherein a flare angle of the first layer is less than 65 degrees, and wherein a flare angle of second layer is less than 65 degrees.

9. The magnetic recording head of claim 1, wherein a flare angle of the first layer is less than a flare angle of the second layer.

10. The magnetic recording head of claim 9, wherein the flare angle of the first layer is 45 degrees, and the flare angle of the second layer is 55 degrees.

11. A magnetic recording drive comprising the magnetic recording head of claim 1.

12. A magnetic recording head, comprising:

a main pole;

a waveguide disposed adjacent to the main pole; and a near field transducer (NFT) coupled between the main pole and the waveguide at a media facing surface (MFS), wherein the NFT comprises:

a first layer comprising a first surface facing the MFS, a second surface, and a third surface opposite the second surface, wherein the second and the third surfaces of the first layer are angled less than 90 degrees relative to a plane perpendicular to the MFS; and a second layer disposed over a first surface of the first layer, the second layer comprising a first surface facing the MFS, a second surface, and a third surface opposite the second surface, wherein:

the second and third surfaces of the second layer are angled relative to a plane perpendicular to the MFS;

the angle of the second and third surfaces of the first layer relative to the plane perpendicular to the MFS is greater than the angle of the second and third surfaces of the second layer relative to the plane perpendicular to the MFS; and a flare angle of the first layer is less than a flare angle of the second layer.

13. The magnetic recording head of claim 12, wherein the angle of the second and third surfaces of the first layer is less than 45 degrees and the angle of the second and third surfaces of the second layer is less than 30 degrees.

14. The magnetic recording head of claim 12, wherein a width of the first surface of the second layer along the MFS is between 10 nm to 50 nm.

15. The magnetic recording head of claim 12, wherein the flare angle of the first layer is less than 65 degrees, and wherein the flare angle of second layer is less than 65 degrees.

16. A magnetic recording drive comprising the magnetic recording head of claim 12.

17. A method of defining a near field transducer (NFT) of a magnetic recording head, the method comprising:

disposing a first mask onto a first surface of a first NFT layer, wherein the first surface is a media facing surface (MFS) of the first NFT layer;

etching or milling a second surface and a third surface of the first NFT layer using the first mask, wherein the second surface is opposite the third surface of the first NFT layer;

removing the first mask;

disposing a second NFT layer over the first surface of the first NFT layer, wherein the second NFT layer comprises a first surface facing the MFS, a second surface, and a third surface opposite the second surface of the second NFT layer;

disposing a second mask over the first surface of the second NFT layer;

etching or milling the second and third surfaces of the second NFT layer using the second mask; and removing the second mask.

18. The method of claim 17, wherein:

the etching or milling of the first NFT layer comprises angling the second and third surfaces of the first NFT layer to a first angle less than 90 degrees relative to a plane perpendicular to the MFS;

the etching or milling of the second NFT layer comprises angling the second and third surfaces of the second NFT layer to a second angle less than 90 degrees relative to the plane perpendicular to the MFS; and the first angle is greater than the second angle.

19. The method of claim 17, wherein:

the etching or milling of the first NFT layer comprises angling the second and third surfaces of the first NFT layer to an angle less than 45 degrees relative to a plane perpendicular to the MFS; and the etching or milling of the second NFT layer comprises angling the second and third surfaces of the second NFT layer to an angle less than 30 degrees relative to a plane perpendicular to the MFS.

20. The method of claim 17, wherein a flare angle of the first NFT layer is less than a flare angle of the second NFT layer.

21. A magnetic recording drive comprising the magnetic recording head formed by the method of claim 17.

\* \* \* \* \*